(12) United States Patent
Vermilion et al.

(10) Patent No.: US 12,276,107 B2
(45) Date of Patent: *Apr. 15, 2025

(54) SHINGLES WITH INCREASED HYDROPHOBICITY

(71) Applicant: Owens Corning Intellectual Capital, LLC, Toledo, OH (US)

(72) Inventors: Donn R. Vermilion, Newark, OH (US); Xiujuan Zhang, Granville, OH (US); William Brian Ward, Brookville, OH (US); Chris Armintrout, Warsaw, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,224

(22) Filed: Feb. 15, 2024

(65) Prior Publication Data

US 2024/0183160 A1    Jun. 6, 2024

Related U.S. Application Data

(63) Continuation of application No. 17/408,616, filed on Aug. 23, 2021, now Pat. No. 11,933,048, which is a
(Continued)

(51) Int. Cl.
*E04D 1/28* (2006.01)
*B32B 37/24* (2006.01)
(Continued)

(52) U.S. Cl.
CPC ............... *E04D 1/28* (2013.01); *B32B 37/24* (2013.01); *E04D 1/00* (2013.01); *E04D 1/20* (2013.01);
(Continued)

(58) Field of Classification Search
None
See application file for complete search history.

(56) References Cited

U.S. PATENT DOCUMENTS 1,494,380 A    5/1924  Schutte
2,263,200 A   11/1941  Wheeler et al.
(Continued)

FOREIGN PATENT DOCUMENTS

AU    2009245565 A1   11/2009
CA       2460741 A1    4/2003
(Continued)

OTHER PUBLICATIONS

Office Action from U.S. Appl. No. 14/623,688 dated May 22, 2017.
(Continued)

*Primary Examiner* — Alexander M Weddle
(74) *Attorney, Agent, or Firm* — Calfee, Halter & Griswold LLP

(57) ABSTRACT

A shingle includes a substrate having an asphalt coating on a top surface of the substrate and on a bottom surface of the substrate. A surface layer of granules is embedded in the asphalt on the top surface of the substrate. A backdust layer of particles is embedded in the asphalt on the bottom surface of the substrate. A sealant is disposed on the backdust. A hydrophobic material is applied to the sealant.

16 Claims, 9 Drawing Sheets

Related U.S. Application Data continuation of application No. 16/136,728, filed on Sep. 20, 2018, now Pat. No. 11,124,968, which is a continuation of application No. 14/623,688, filed on Feb. 17, 2015, now abandoned.

(60) Provisional application No. 61/942,673, filed on Feb. 21, 2014.

(51) Int. Cl.
  E04D 1/00 (2006.01)
  E04D 1/20 (2006.01)
  E04D 1/26 (2006.01)

(52) U.S. Cl.
  CPC ..... *B32B 2037/243* (2013.01); *B32B 2395/00* (2013.01); *B32B 2419/06* (2013.01); *E04D 2001/005* (2013.01); *E04D 1/26* (2013.01); *Y10T 428/24364* (2015.01); *Y10T 428/24372* (2015.01); *Y10T 428/2438* (2015.01); *Y10T 428/24388* (2015.01); *Y10T 428/24413* (2015.01)

(56) References Cited

U.S. PATENT DOCUMENTS

| | | | |
|---|---|---|---|
| 2,332,221 A | 10/1943 | Harshberger | |
| 2,438,890 A | 4/1948 | Baskin | |
| 2,833,673 A | 5/1958 | Hart et al. | |
| 2,863,405 A | 12/1958 | Leibrook et al. | |
| 3,042,193 A | 7/1962 | Wendt | |
| 3,045,395 A | 7/1962 | Fasold et al. | |
| 3,138,897 A | 6/1964 | McCorkle | |
| 3,239,992 A | 3/1966 | Hodgson | |
| 3,247,631 A | 4/1966 | Lovness | |
| 3,252,257 A * | 5/1966 | Price | E04D 1/26 52/518 |
| 3,813,280 A | 5/1974 | Olszyk et al. | |
| 3,903,340 A | 9/1975 | Shepherd | |
| 4,078,104 A | 3/1978 | Martin | |
| 4,173,489 A | 11/1979 | Crawford et al. | |
| 4,243,426 A | 1/1981 | Marzocchi et al. | |
| 4,447,500 A | 5/1984 | Ferris | |
| 4,992,315 A | 2/1991 | Zickell et al. | |
| 5,082,704 A | 1/1992 | Higgins | |
| 5,240,760 A | 8/1993 | George et al. | |
| 5,382,449 A | 1/1995 | Hedges | |
| 5,756,214 A | 5/1998 | Waldron et al. | |
| 5,996,300 A | 12/1999 | Hamlin | |
| 6,426,309 B1 | 7/2002 | Miller et al. | |
| 6,506,444 B1 | 1/2003 | Mahr et al. | |
| 6,524,682 B1 | 2/2003 | Leavell | |
| 6,531,200 B2 | 3/2003 | Zickell et al. | |
| 6,610,147 B2 | 8/2003 | Aschenbeck | |
| 6,635,140 B2 | 10/2003 | Phillips et al. | |
| 6,701,685 B2 * | 3/2004 | Rippey | E04D 5/12 428/40.1 |
| 6,709,994 B2 | 3/2004 | Miller et al. | |
| 6,887,515 B2 | 5/2005 | Zickell | |
| 6,919,398 B1 | 7/2005 | Born et al. | |
| 6,921,787 B2 | 7/2005 | Bate | |
| 7,183,358 B2 | 2/2007 | Bastelberger et al. | |
| 7,238,408 B2 | 7/2007 | Aschenbeck et al. | |
| 7,375,152 B2 | 5/2008 | Bate | |
| 7,442,270 B2 | 10/2008 | Bartek | |
| 7,449,233 B2 | 11/2008 | Arora | |
| 7,452,598 B2 | 11/2008 | Shiao et al. | |
| 7,514,017 B2 | 4/2009 | Bhamidipati | |
| 7,524,545 B2 | 4/2009 | Bany et al. | |
| 7,541,059 B2 | 6/2009 | Aschenbeck et al. | |
| 7,651,559 B2 | 1/2010 | Whitaker et al. | |
| 7,737,057 B2 | 6/2010 | Bany et al. | |
| 7,803,725 B2 | 9/2010 | Payne et al. | |
| 7,805,909 B2 | 10/2010 | Teng et al. | |
| 7,833,339 B2 | 11/2010 | Whitaker et al. | |
| 7,977,259 B2 | 7/2011 | Ratcliff et al. | |
| 8,058,342 B1 | 11/2011 | Stevens et al. | |
| 8,530,034 B2 | 9/2013 | Khan et al. | |
| 8,568,524 B2 | 10/2013 | Li et al. | |
| 8,771,826 B2 | 7/2014 | Whitaker et al. | |
| 9,259,860 B2 | 2/2016 | Kalkanoglu et al. | |
| 9,446,568 B2 | 9/2016 | Larson et al. | |
| 9,511,566 B2 | 12/2016 | Grube et al. | |
| 9,574,350 B2 | 2/2017 | Loftus et al. | |
| 9,670,677 B2 | 6/2017 | Shiao et al. | |
| 9,700,915 B2 | 7/2017 | Ruda | |
| 9,834,626 B2 | 12/2017 | Chisholm et al. | |
| 9,850,623 B2 | 12/2017 | Krigstin et al. | |
| 9,970,153 B2 | 5/2018 | Deng et al. | |
| 10,060,132 B2 | 8/2018 | Beerer et al. | |
| 10,113,314 B2 | 10/2018 | Humphreys | |
| 10,458,119 B2 | 10/2019 | Grubka et al. | |
| 10,584,494 B2 | 3/2020 | Wise et al. | |
| 10,697,179 B2 | 6/2020 | Humphreys | |
| 10,865,565 B2 | 12/2020 | Smith et al. | |
| 10,865,566 B2 | 12/2020 | Smith et al. | |
| 10,865,567 B2 | 12/2020 | Smith et al. | |
| 11,124,968 B2 | 9/2021 | Vermilion et al. | |
| 11,136,761 B2 | 10/2021 | Vermilion et al. | |
| 11,359,377 B2 | 6/2022 | Smith et al. | |
| 2003/0068469 A1 | 4/2003 | Aschenbeck et al. | |
| 2004/0014385 A1 | 1/2004 | Greaves, Jr. et al. | |
| 2004/0206035 A1 | 10/2004 | Kandalgaonkar | |
| 2004/0258883 A1 | 12/2004 | Weaver | |
| 2005/0072110 A1 | 4/2005 | Shiao et al. | |
| 2005/0252141 A1 | 11/2005 | Kerkar et al. | |
| 2005/0260910 A1 | 11/2005 | Brzozowski et al. | |
| 2006/0179767 A1 | 8/2006 | Miller et al. | |
| 2006/0235143 A1 | 10/2006 | Muller et al. | |
| 2006/0240224 A1 | 10/2006 | Khan et al. | |
| 2006/0243388 A1 | 11/2006 | Kubiak et al. | |
| 2007/0044410 A1 * | 3/2007 | Kalkanoglu | E04D 1/26 52/526 |
| 2007/0049144 A1 | 3/2007 | Brzozowski et al. | |
| 2007/0224135 A1 | 9/2007 | Liu et al. | |
| 2007/0261337 A1 | 11/2007 | Whitaker et al. | |
| 2008/0011194 A1 | 1/2008 | Mecca et al. | |
| 2008/0044626 A1 | 2/2008 | Aschenbeck et al. | |
| 2008/0060301 A1 | 3/2008 | Wang et al. | |
| 2008/0086970 A1 | 4/2008 | Teng et al. | |
| 2008/0115444 A1 | 5/2008 | Kalkanoglu et al. | |
| 2008/0193778 A1 | 8/2008 | Bakir et al. | |
| 2009/0220743 A1 | 9/2009 | Aschenbeck et al. | |
| 2009/0249728 A1 | 10/2009 | Teng et al. | |
| 2010/0005745 A1 | 1/2010 | Harrington, Jr. | |
| 2010/0098912 A1 | 4/2010 | Snyder et al. | |
| 2010/0151198 A1 | 6/2010 | Khan | |
| 2010/0203290 A1 | 8/2010 | Whitaker et al. | |
| 2010/0236178 A1 | 9/2010 | Loftus et al. | |
| 2010/0291818 A1 | 11/2010 | Youn | |
| 2010/0307087 A1 | 12/2010 | Zoellner | |
| 2011/0072752 A1 | 3/2011 | Aschenbeck et al. | |
| 2011/0139366 A1 | 6/2011 | Belt et al. | |
| 2011/0257295 A1 | 10/2011 | Li et al. | |
| 2011/0265407 A1 | 11/2011 | Bryson | |
| 2011/0283646 A1 | 11/2011 | Vermilion et al. | |
| 2012/0258282 A1 | 10/2012 | Hammond | |
| 2012/0260597 A1 | 10/2012 | Jenkins et al. | |
| 2012/0288678 A1 | 11/2012 | Grube et al. | |
| 2012/0305171 A1 | 12/2012 | Hammond | |
| 2013/0089707 A1 | 4/2013 | Faure | |
| 2013/0122232 A1 | 5/2013 | Hopkins, II | |
| 2013/0122769 A1 | 5/2013 | Brabbs et al. | |
| 2013/0160674 A1 | 6/2013 | Hong et al. | |
| 2013/0167965 A1 | 7/2013 | Cheney et al. | |
| 2013/0171414 A1 | 7/2013 | Shiao et al. | |
| 2014/0272402 A1 | 9/2014 | Dubey et al. | |
| 2015/0175317 A1 | 6/2015 | Imai et al. | |
| 2015/0239005 A1 | 8/2015 | Humphreys | |
| 2015/0240495 A1 | 8/2015 | Vermilion et al. | |
| 2015/0275521 A1 | 10/2015 | Bader et al. | |
| 2016/0186437 A1 | 6/2016 | Harrington et al. | |
| 2016/0244969 A1 | 8/2016 | Beerer et al. | |

(56) References Cited

U.S. PATENT DOCUMENTS

| | | |
|---|---|---|
| 2016/0369509 A1 | 12/2016 | Leitch et al. |
| 2017/0029649 A1 | 2/2017 | Ali et al. |
| 2017/0321423 A1 | 11/2017 | Aschenbeck et al. |
| 2017/0362830 A1 | 12/2017 | Buckingham et al. |
| 2018/0051465 A1 | 2/2018 | Grubka et al. |
| 2018/0087275 A1 | 3/2018 | Canova et al. |
| 2018/0281017 A1 | 10/2018 | Humphreys et al. |
| 2018/0291629 A1 | 10/2018 | Humphreys |
| 2018/0363302 A1 | 12/2018 | Beerer et al. |
| 2019/0017273 A1 | 1/2019 | Vermilion et al. |
| 2019/0032337 A1 | 1/2019 | Sipag et al. |
| 2019/0077700 A1 | 3/2019 | Xu et al. |
| 2019/0271160 A1 | 9/2019 | Freeborg et al. |
| 2019/0277028 A1 | 9/2019 | Chevillard et al. |
| 2021/0164228 A1 | 6/2021 | Fu et al. |
| 2021/0214944 A1 | 7/2021 | Verhoff et al. |
| 2021/0381240 A1 | 12/2021 | Vermilion et al. |
| 2021/0381241 A1 | 12/2021 | Vermilion et al. |
| 2022/0268025 A1 | 8/2022 | Smith et al. |
| 2022/0389715 A1 | 12/2022 | Lane et al. |

FOREIGN PATENT DOCUMENTS

| | | |
|---|---|---|
| CA | 2508484 C | 7/2010 |
| CA | 2759718 A1 | 5/2013 |
| CA | 2559855 C | 5/2015 |
| CA | 2882641 A1 | 8/2015 |
| CA | 2921279 A1 | 8/2016 |
| CA | 2933050 A1 | 12/2016 |
| CA | 2923675 C | 8/2017 |
| CA | 3035791 A1 | 9/2019 |
| CA | 3044450 A1 | 1/2020 |
| CA | 3100855 A1 | 1/2020 |
| CN | 1439683 A | 9/2003 |
| CN | 200958267 Y | 10/2007 |
| CN | 203499128 U | 3/2014 |
| CN | 203654622 U | 6/2014 |
| CN | 105131765 A | 12/2015 |
| CN | 105802410 A | 7/2016 |
| CN | 107177246 A | 9/2017 |
| DE | 102007050727 A1 | 4/2008 |
| EP | 2455560 A2 | 5/2012 |
| GB | 813520 A | 5/1959 |
| GB | 1398895 A | 6/1975 |
| WO | 03031748 A2 | 4/2003 |
| WO | 03044124 A1 | 5/2003 |
| WO | 03097757 A1 | 11/2003 |
| WO | 2004050774 A2 | 6/2004 |
| WO | 2006060714 A1 | 6/2006 |
| WO | 2007078903 A1 | 7/2007 |
| WO | 2007133393 A1 | 11/2007 |
| WO | 2014038701 A1 | 3/2014 |
| WO | 2016082025 A1 | 6/2016 |
| WO | 2016210379 A1 | 12/2016 |
| WO | 2019077604 A1 | 4/2019 |
| WO | 2020006430 A1 | 1/2020 |
| WO | 2020168019 A1 | 8/2020 |

OTHER PUBLICATIONS

Office Action from U.S. Appl. No. 14/623,688 dated Nov. 13, 2017.
Office Action from U.S. Appl. No. 14/623,688 dated Nov. 13, 2018.
Office Action from U.S. Appl. No. 14/623,688 dated May 7, 2019.
Office Action from U.S. Appl. No. 16/136,728 dated Apr. 3, 2019.
Office Action from U.S. Appl. No. 16/136,728 dated Jul. 2, 2019.
Office Action from U.S. Appl. No. 16/136,728 dated Nov. 25, 2019.
Office Action from U.S. Appl. No. 16/136,728 dated Mar. 9, 2020.
Examiner's Answer from U.S. Appl. No. 16/136,728 dated Oct. 14, 2020.
Patent Board Decision from U.S. Appl. No. 16/136,728 dated Mar. 11, 2021.
Notice of Allowance from U.S. Appl. No. 16/136,728 dated May 28, 2021.
Office Action from U.S. Appl. No. 16/534,204 dated Oct. 21, 2020.
Office Action from U.S. Appl. No. 16/534,204 dated Mar. 30, 2021.
Notice of Allowance from U.S. Appl. No. 16/534,204 dated Jun. 15, 2021.
Notice of Allowance from U.S. Appl. No. 17/408,616 dated Nov. 17, 2023.
Author Unknown, Pubchem Online, Calcium Stearate (Year: 2022).
Splash Proof, LLC, "What is Splash Proof Nanotechnology Coating?" (2018), 2 pages, retrieved from the internet at: https://splashproofamerica.com/our-product/.
NanoSeal Tile Roof Sealant (2017-2018), 7 pages, retrieved from the internet at: http://nanoseal.com/tile-roof-coating/.
T.T Chau et al., "A review of factors that affect contact angle and implications for flotation practice," Advances in Colloid and Interface Science 150, pp. 106-115 (2009).
Office Action from U.S. Appl. No. 17/406,302 dated Apr. 3, 2024.
Office Action from U.S. Appl. No. 17/406,302 dated Jul. 8, 2024.
Office Action from CA Application No. 3,153,596 dated Sep. 26, 2024.
Office Action from U.S. Appl. No. 17/406,302 dated Jan. 13, 2025.

* cited by examiner

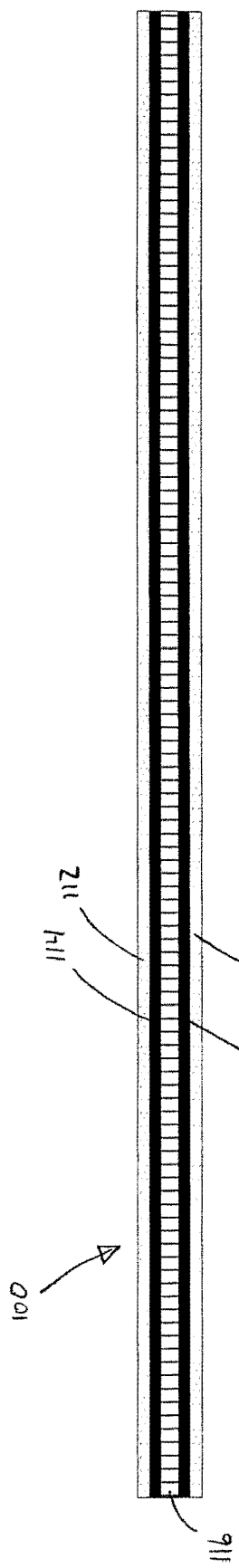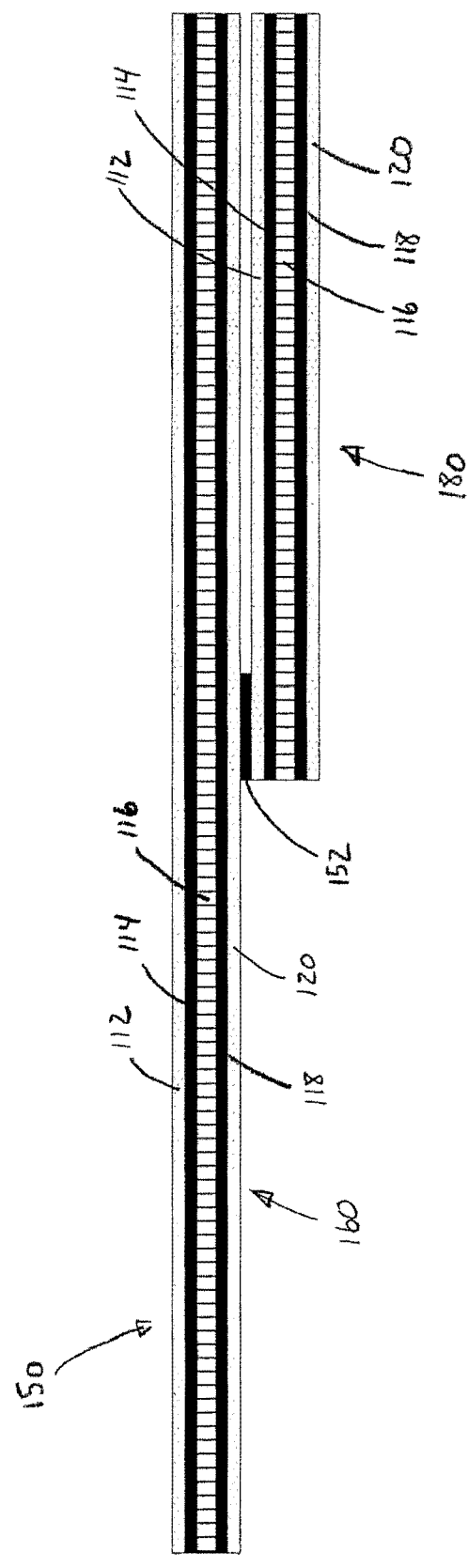

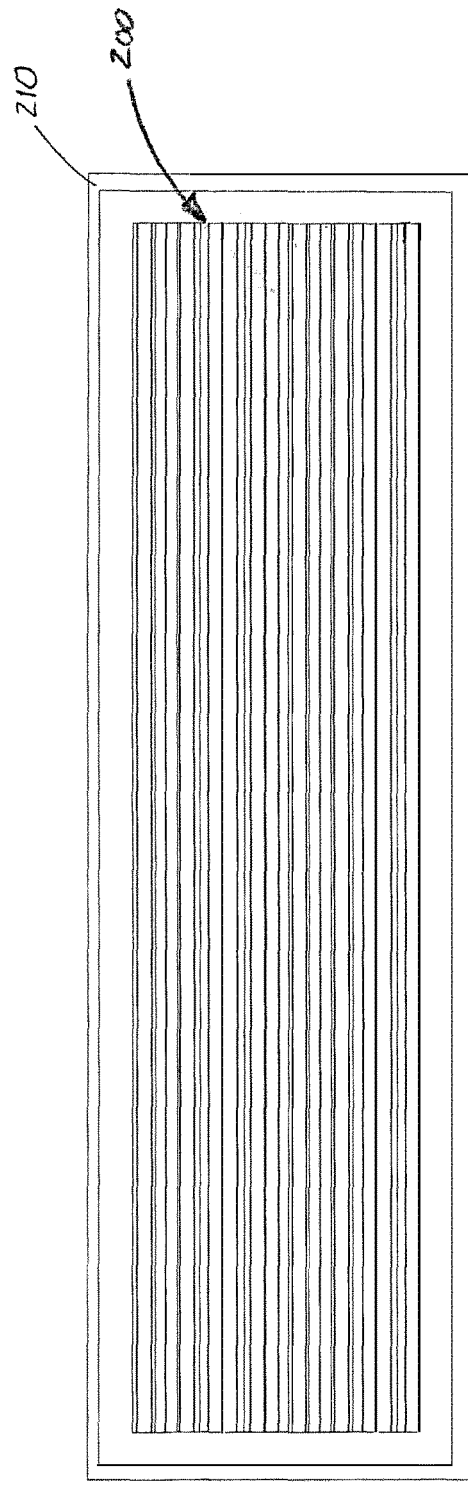
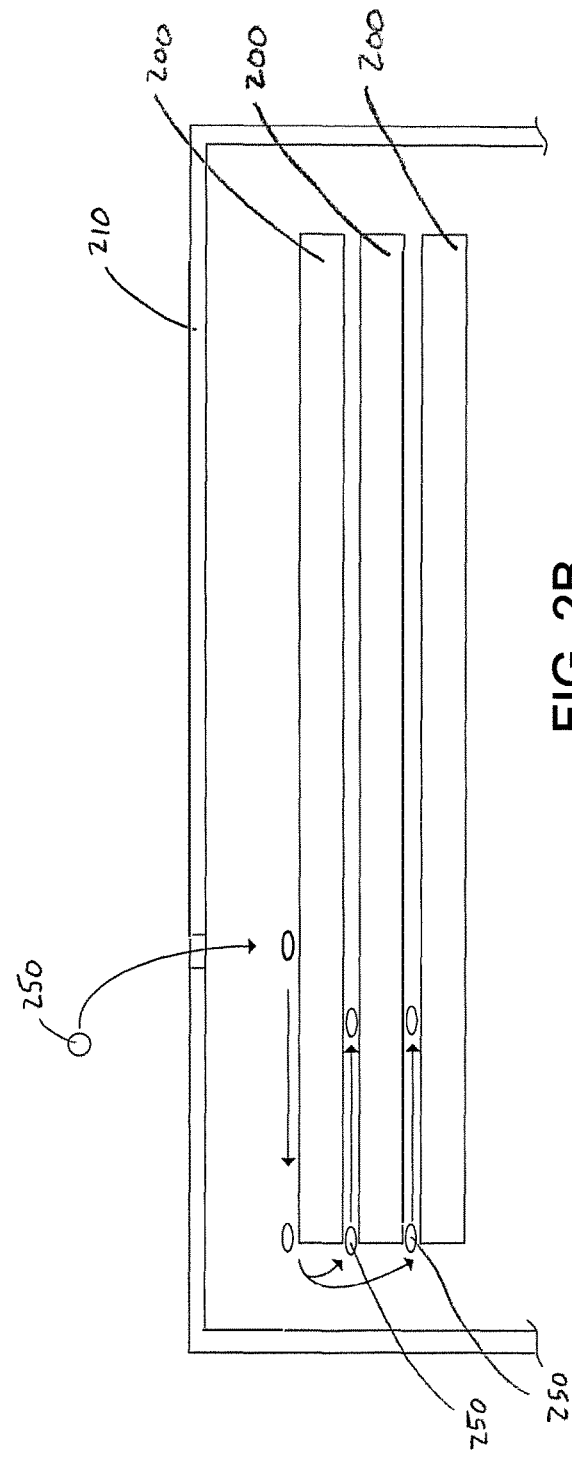
FIG. 2A
FIG. 2B

FIG. 3B
FIG. 3A
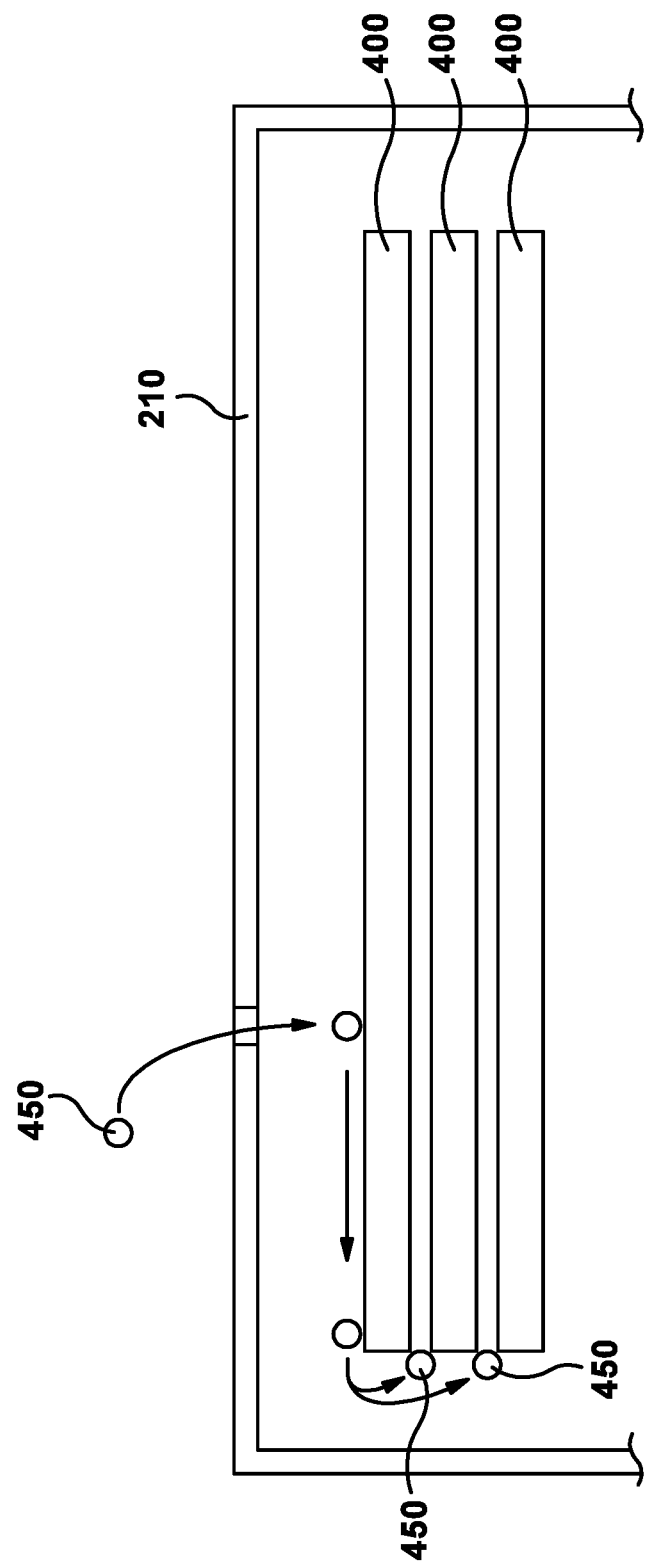
FIG. 4

SHINGLES WITH INCREASED HYDROPHOBICITY

RELATED APPLICATIONS

The present application is a continuation of U.S. patent application Ser. No. 17/408,616, filed on Aug. 23, 2021, which is a continuation of U.S. patent application Ser. No. 16/136,728, filed on Sep. 20, 2018, now U.S. Pat. No. 11,124,968, which is a continuation of U.S. patent application Ser. No. 14/623,688, filed on Feb. 17, 2015, now abandoned, which claims the benefit of U.S. Provisional Patent Application Ser. No. 61/942,673, filed on Feb. 21, 2014, all of which are incorporated herein by reference.

FIELD OF THE INVENTION

The present application relates to roofing materials, such as shingles. In particular, the present application relates to roofing materials, such as shingles, with increased hydrophobicity as compared to otherwise identical, roofing materials or shingles.

BACKGROUND

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating. Furthermore, physical and chemical factors such as surface roughness and heterogeneity as well as particle shape and size have been found to influence the contact angle and wetting behavior of solid particles. See, e.g., T. T. Chau, et al., "A review of factors that affect contact angle and implications for flotation practice," Advances in Colloid and Interface Science 150, pp. 106-115 (2009). The entire disclosure of the Chau reference is hereby incorporated by reference.

SUMMARY

One exemplary embodiment of a shingle includes a substrate having an asphalt coating on a top surface of the substrate and on a bottom surface of the substrate. A surface layer of granules is embedded in the asphalt on the top surface of the substrate. A backdust layer of particles is embedded in the asphalt on the bottom surface of the substrate. A sealant is disposed on the backdust. A hydrophobic material is applied to the sealant.

BRIEF DESCRIPTION OF THE DRAWINGS

FIG. 1A is a side elevational view of an exemplary embodiment of a shingle;

FIG. 1B is a side elevational is a side elevational view of a shingle;

FIG. 2A illustrates an exemplary embodiment of shingles stacked in a package;

FIG. 2B is a schematic illustration of shingles stacked in a package and moisture wicking or infiltrating between the layers of the stacked shingles;

FIG. 3A illustrates the contact angle of a moisture droplet that is greater than ninety degrees;

FIG. 3B illustrates the contact angle of a moisture droplet that is less than 90 degrees;

FIG. 4 is a schematic illustration of an exemplary embodiment where a moisture droplet moving down along a side of a stack of shingles;

DETAILED DESCRIPTION

In the embodiments herein, the invention of the present application is discussed for use with roofing shingles. However, it should be understood that the invention of the present application may be used with any type of roofing material, such as, for example, asphalt-based roll roofing and commercial roofing.

Figure 1C:
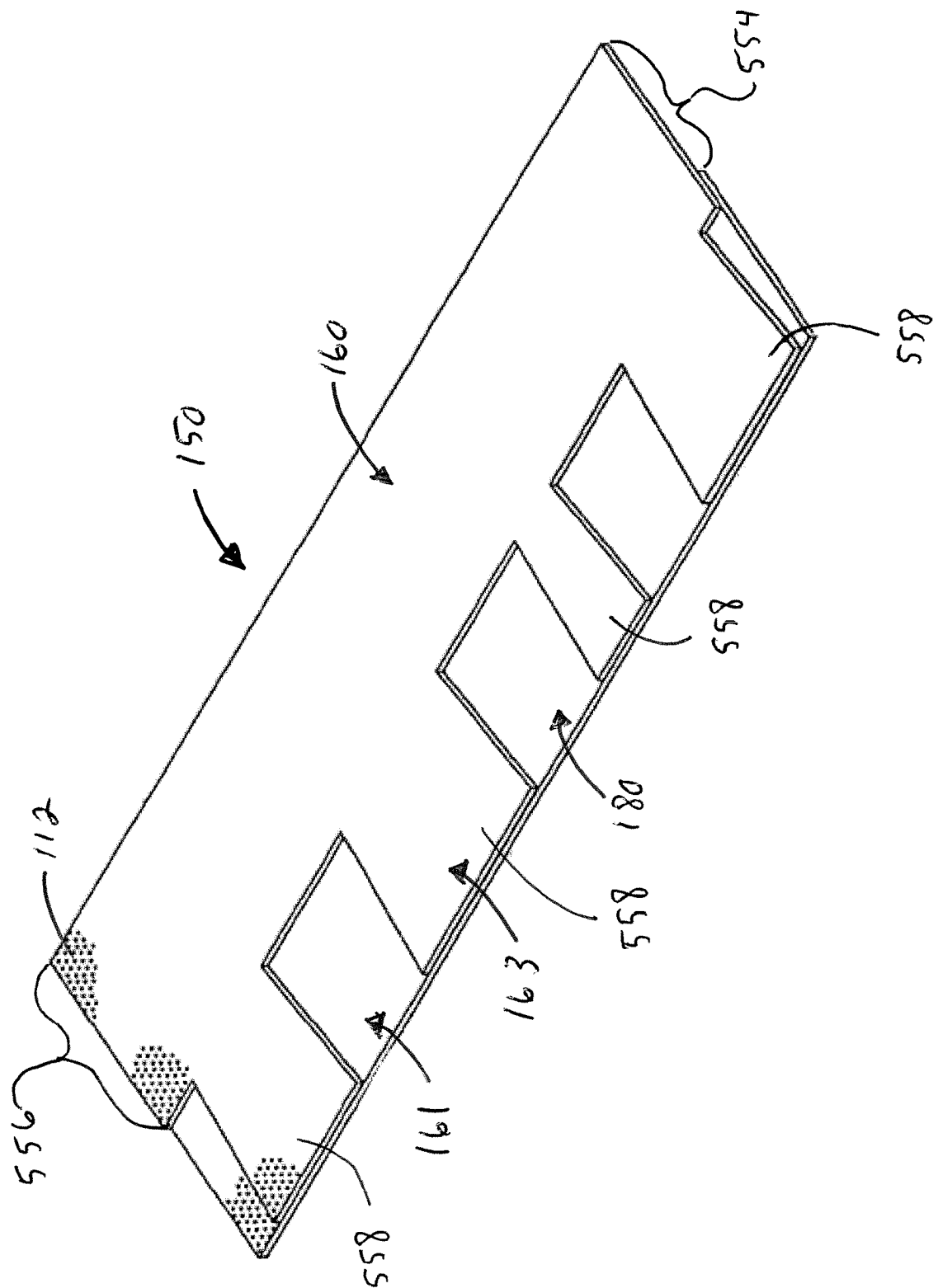
FIG. 1C is a top perspective view of a laminated shingle.

As illustrated in FIG. 1A, a shingle 100 generally comprises a substrate 116 that is infiltrated with asphalt forming a first asphalt coating 114 on the top surface of the substrate and a second asphalt coating 118 on the bottom surface of the substrate. The shingle also generally comprises a surface layer of granules 112 embedded in the first asphalt coating and a backdust layer of particles 120 embedded in the second asphalt coating. The first asphalt coating 114 is positioned above the substrate 116 when the shingles are installed on a roof and the second asphalt coating 118 is positioned below the substrate when the shingles are installed on the roof.

A shingle may also comprise one or more sheets laminated together to form a laminated shingle. For example, as illustrated in FIG. 1B, a shingle 150 comprises an upper or overlay sheet 160 attached to a lower or underlay sheet 180 with an adhesive 152 to form the laminated shingle. The overlay sheet 160 extends the full width of the shingle 150 and includes cutouts 161 defining tabs 163 on a front tab portion of the shingle. An optional release paper covered adhesive strip (not shown) may be disposed on a lower or rear surface of the overlay sheet 160 along a rear headlap portion of the shingle 150. Similar to the shingle 100, each sheet generally comprises a substrate 116, a first asphalt coating 114 on the top surface of the substrate, a surface layer of granules 112 embedded in the first asphalt coating, a second asphalt coating 118 on the bottom surface of the substrate, and a backdust layer of particles 120 embedded in the second asphalt coating.

The substrate of the shingle can be any type known for use in reinforcing asphalt-based roofing materials, such as a web, scrim or felt of fibrous materials such as mineral fibers, cellulose fibers, rag fibers, mixtures of mineral and synthetic fibers, or the like. Combinations of materials can also be used in the substrate. In certain embodiments, the substrate is a nonwoven web of glass fibers. The substrate may be any conventional substrate used in asphalt shingles, roll roofing, low-slope membranes, and the like.

The asphalt coatings are generally formed from a layer of hot, melted asphalt applied to the substrate. The asphalt coating can be applied to the substrate in any suitable manner. For example, the substrate can be submerged in the asphalt or the asphalt can be rolled on, sprayed on, or applied to the substrate by other means. The asphalt coating may also be any type of bituminous material suitable for use on a roofing material, such as asphalts, tars, pitches, or mixtures thereof. The asphalt can be either a manufactured asphalt produced by refining petroleum or a naturally occurring asphalt. The asphalt coating can include various additives and/or modifiers, such as inorganic fillers or mineral stabilizers, organic materials such as polymers, recycled streams, or ground tire rubber. In certain embodiments, the asphalt coatings comprise asphalt and inorganic fillers or mineral stabilizers. The asphalt coatings may be any conventional asphalt used in shingles, and can be applied in any conventional manner or in any conventional amount or thickness.

The granules are generally deposited onto the asphalt coating after the coating is applied to the substrate. The shingles may be passed through rollers to further embed the granules into the asphalt coating. The granules may comprise a variety of different materials. The granules may be ceramic roofing grade granules that are made in any known or conventional manner. Any type of roofing granule may be used. The granules may comprise a variety of different particle sizes and colors. Further, a variety of different granules may be blended together, e.g., to provide different color blends or to provide the appearance of varying thickness to the shingle.

The backdust particles are generally deposited onto the asphalt coating after the coating is applied to the substrate. The shingles may be passed through rollers to further embed the backdust particles into the asphalt coating. The backdust may comprise a variety of different materials, including but not limited to, Quartz ($SiO_2$), K-Feldspar ($KAlSi_3O_8$), Na-Feldspar ($NaAlSi_3O_8$), Dolomite ($CaMg(CO_3)_2$), pulverized sand, talc, mica, calcium carbonate, ground recycled glass, or other common inorganic material. The backdust may comprise a variety of different particle sizes. For example, the backdust particles may have an average particle size between about 20 and 1000 µm, 60 and 600 µm, 100 and 400 µm, or 100 and 300 µm. In certain embodiments, the backdust particles have an average particle size of about 200 µm. The backdust may be any material that prevents the shingles from sticking together after being stacked, packaged, and/or stored for a prolonged period of time.

One or more portions of the shingle may comprise an additional layer, such as a reinforcement layer. In certain embodiments, the additional layer may be attached to the asphalt coating, e.g., by the adhesive mixture of the asphalt coating or other adhesives. In certain embodiments, the additional layer may be a polymeric layer formed from, for example, a polyester, polyolefin (e.g., polypropylene or polyethylene), or the like. However, the additional layer may be formed from other materials, such as, for example, paper, film, scrim material, and woven or non-woven glass.

For example, in certain embodiments, the shingle may include a strip of woven polyester material applied to the surface of the shingle after application of the asphalt coating, such that the asphalt material penetrates the strip between the woven fibers of the polyester fabric, to embed the strip of material in the base asphaltic layer and secure the strip to the shingle. The polyester strip may be applied prior to granule coating of the shingle, and the granules may not adhere to the strip-covered portion of the shingle. The strip of polyester material may, for example, define a shingle nail zone and provide reinforcement for the nailed portion of the shingle.

In certain embodiments, a portion of the lower surface of the shingle may be covered by a sheet of spun-bound nonwoven polyester web or mat material that is pressed into the hot asphalt material of the asphalt coating prior to backdust coating of the shingle. The hot asphalt material penetrates between the nonwoven polyester fibers to embed the mat in the base asphaltic layer. The nonwoven mat may provide additional impact resistance for the shingle, to resist damage caused by hail or other such impacts.

Shingles are generally stacked and packaged for storage and transport, e.g. in a wrapper, bag, box, or the like. The package may take a wide variety of forms, such as a plastic wrapper, a plastic bag, shrink wrap, a cardboard box, a polyethylene wrapper (e.g., 1.5-2.5 mil thick), or the like. FIG. 2A illustrates shingles 200 stacked in a package 210. Often, over time, the package 210 will develop small holes or openings that permit moisture penetration during extended storage periods. Further, the package 210 may become damaged during handling permitting moisture to enter the shingle package. As illustrated in FIG. 2B, the moisture 250 will often wick or infiltrate between the layers of stacked shingles 200 resulting in the shingles being in a wet condition.

The Applicants have discovered that applying a hydrophobic material to surfaces of the shingles increases the contact angle of the moisture on the surfaces and decreases the wetting of the shingle bundle by prohibiting the moisture from wicking or infiltrating between the stacked shingles. Thus, the greater the contact angle the less moisture infiltrates between the layers of shingles. The contact angle of a moisture droplet is the angle formed by the moisture droplet at the three phase boundary where the liquid, gas, and solid intersect. FIGS. 3A and 3B illustrate the contact angle of a moisture droplet of greater than 90 degrees and less than 90 degrees, respectively.

For example, FIG. 2B illustrates the moisture droplet 250 having a contact angle less than about 70 degrees with the shingle back, e.g., between about 40 and 70 degrees, infiltrating between stacked shingles 200 in the bundle. FIG. 4 illustrates a moisture droplet 450 having a contact angle greater than about 70 degrees with the shingle back, e.g., between about 70 and 120 degrees, that is inhibited from infiltrating between the shingles 400. The applicants have discovered that a contact angle greater than about 70 degrees, greater than about 80 degrees, and greater than about 90 degrees sufficiently inhibits the moisture from infiltrating between the shingles such that the shingles were almost completely dry (i.e., less than 25%, less than 15%, less than 10%, or less than 5% of the bottom surface area of the second shingle from the top of the stack was wet) when the bundle is exposed to 2.2 inches of rain per hour for 24 hours.

The hydrophobic material applied to the shingles may take a variety of different forms. For example, the hydrophobic material may be a coating on one or more surfaces of the shingle. Further, the backdust and/or granules may be coated with a hydrophobic material before being applied to the shingle (e.g., at the supplier) and/or after being applied to the shingle. Further, the material of the backdust and/or granules themselves may have hydrophobic properties. The hydrophobic material may also be applied to any surface of the shingle, such as, for example, around only the edges of the shingle, only on the back of the shingle, or on the back and front of the shingle. Further, the hydrophobic material may also be applied only to the edges of the shingle bundle to prohibit moisture infiltration between the shingles.

Figure 5:
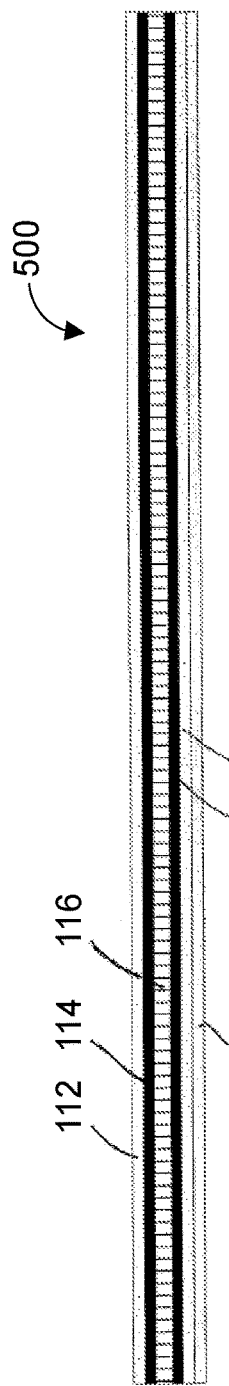
FIG. 5 is a cross sectional view of an exemplary embodiment of a shingle with a hydrophobic material applied to a back or lower surface of the shingle.
Figure 6:
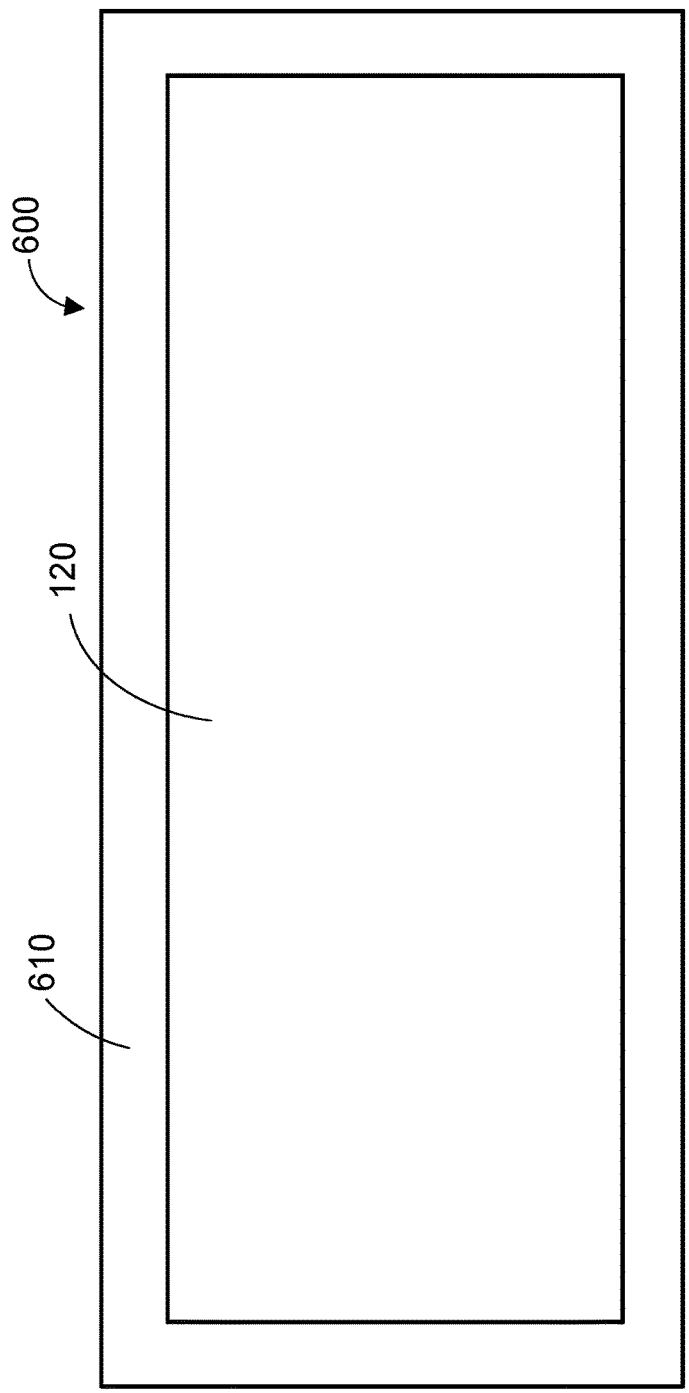
FIG. 6 is a bottom view of an exemplary embodiment of a shingle with a hydrophobic material applied only to edges of a lower surface of the shingle.

For example, FIG. 5 illustrates a cross sectional view of a shingle 500 with a hydrophobic material 510 applied to the back or lower surface of the shingle. The hydrophobic material 510 may be sprayed on, rolled on, or otherwise applied to the surface of the shingle 500. Further, the backdust of the shingle may be coated with the hydrophobic material 510 before being applied to the shingle (e.g., at the supplier) and/or after being applied to the shingle or some of the backdust may be a hydrophobic material, such as Titanium dioxide. FIG. 6 illustrates a bottom view of a shingle 600 with a hydrophobic material 610 applied only to the edges of the lower surface of the shingle. As shown, the hydrophobic material 610 extends a distance between about 0.5 and 3 inches in from each edge of the lower surface, such as between 1 and 2 inches from each edge of the lower surface. However, the hydrophobic material may be applied closer or further from the edge of the lower surface, such as, for example, depending on the size and makeup of the shingle and/or the surrounding environmental conditions. It should be understood that the hydrophobic material may be applied to other portions of the shingle as well, including the top surface and sides of the shingle.

Figure 1D:
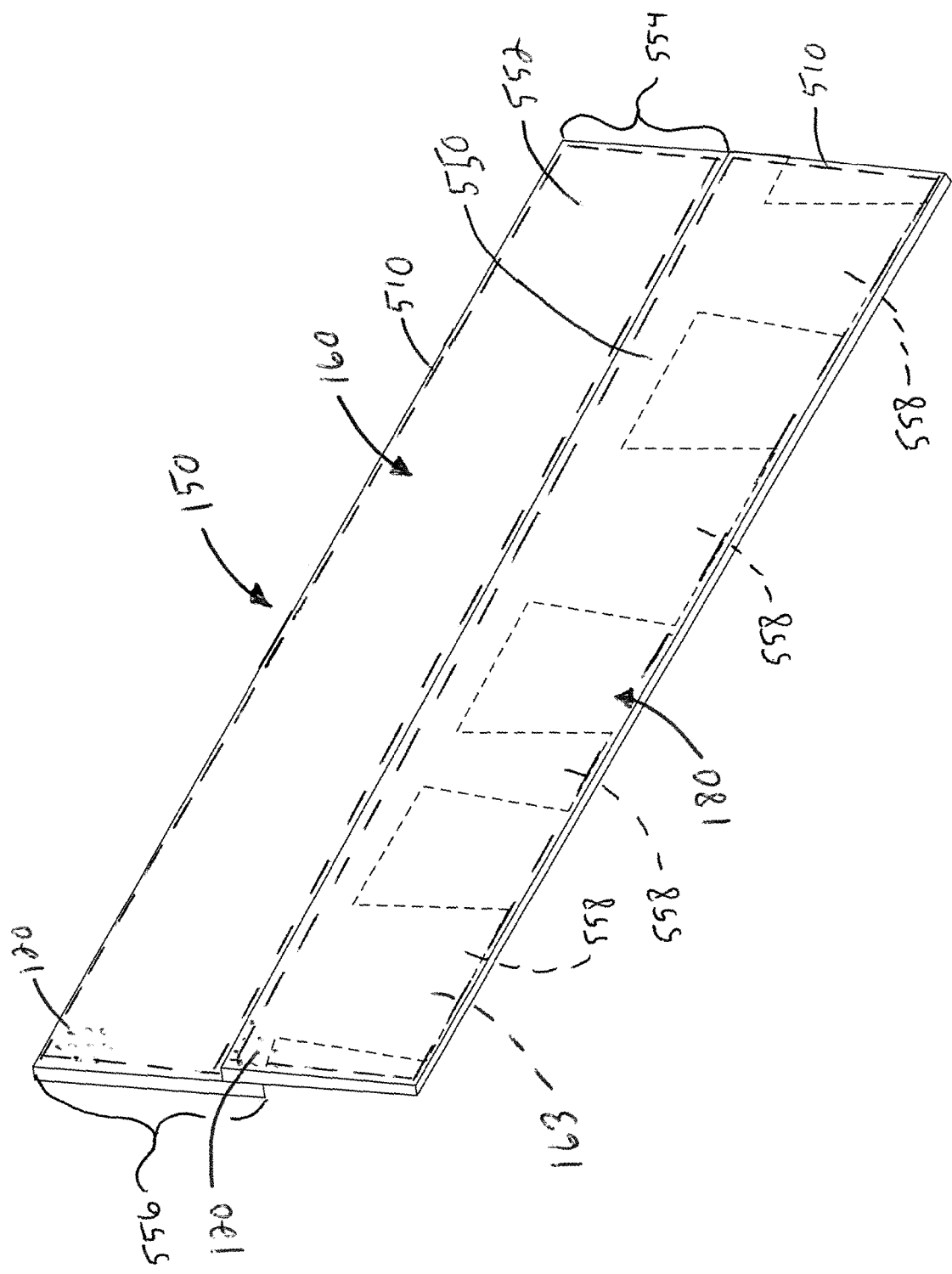
FIG. 1D is a bottom perspective view of the laminated shingle illustrated by FIG. 1C.
Figure 1E:
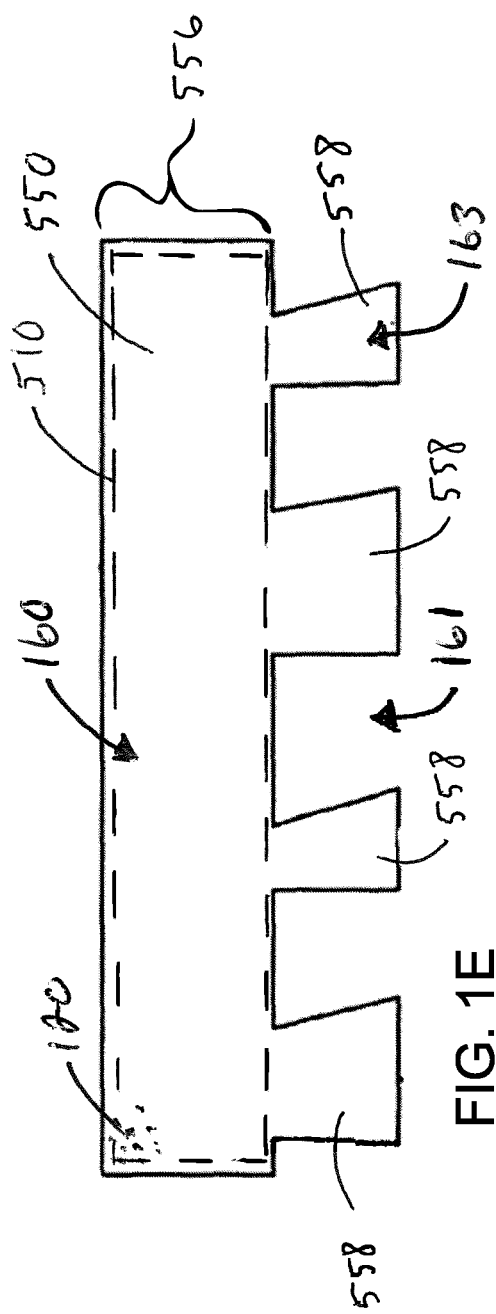
FIG. 1E is a bottom plan view of a top layer of the laminated shingle illustrated by FIG. 1C.
Figure 1F:
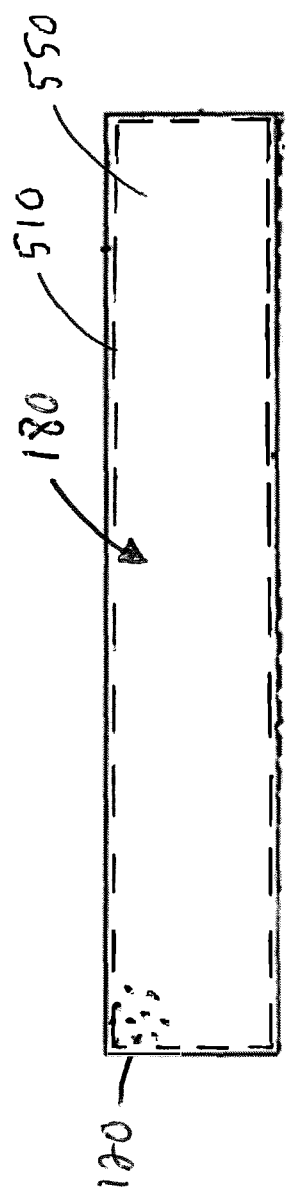
FIG. 1F is a bottom plan view of a bottom layer of the laminated shingle illustrated by FIG. 1C.

Referring to FIGS. 1D, 1E, and IF, in one exemplary embodiment, the hydrophobic material 510 (illustrated by dashed lines) is applied to a rear surface 550 of the underlay sheet 180 and to a rear surface 552 of the overlay sheet 160. In the illustrated embodiment, the hydrophobic material 510 is applied to the entire rear surface 550 or substantially the entire rear surface 550 of the underlay sheet 180. In the illustrated embodiment, the hydrophobic material 510 is applied to the portion 554 of the rear surface 552 of the overlay sheet 180 that is not covered by the underlay sheet 160 or that is substantially not covered by the underlay sheet. In one exemplary embodiment, the hydrophobic material 510 is applied to a rear surface 552 of a headlap portion 556 of the overlay sheet 180 and the hydrophobic material 510 is not applied to a rear surface 552 of tab portions 558 of the overlay sheet 180.

Referring to FIGS. 1D, 1E, and IF, in one exemplary embodiment, the hydrophobic material 510 is applied to a rear surface 550 of the underlay sheet 180 and to a rear surface 552 of the overlay sheet 160 before the underlay sheet 180 and the overlay sheet 160 are laminated together. In another exemplary embodiment, the hydrophobic material 510 is applied to a rear surface 550 of the underlay sheet 180 and to a rear surface 552 of the overlay sheet 160 after the underlay sheet 180 and the overlay sheet 160 are laminated together.

In another exemplary embodiment, the hydrophobic material 510 applied only to the edges of the lower surface of the laminated shingle 150. For example, the hydrophobic material 510 extends a distance between about 0.5 and 3 inches in from each edge of the lower surface, such as between 1 and 2 inches from each edge of the lower surface.

The Applicants have found that applying the hydrophobic material to at least one of the upper surface (i.e., top) and lower surface (i.e., back or bottom) of the shingle (e.g., around the edges of the lower surface) prohibits moisture from infiltrating between the stacked shingles. As illustrated in FIGS. 2B and 4, when moisture travels down the side of the stacked shingles, the moisture will attempt to infiltrate between the shingles. When the moisture contacts a hydrophobic material applied to either the upper or lower surface of the shingle, or both, the moisture will "bead" up and prohibit moisture from infiltrating between the shingles. In this regard, the contact angle of the moisture contacting the hydrophobic material is such that the moisture is prohibited from penetrating between the shingles. For example, in certain embodiments the contact angle may be greater than about 70 degrees, greater than about 80 degrees, or greater than about 90 degrees. As such, the hydrophobic material repels the moisture. As discussed below, the Applicants have found that applying the hydrophobic material to the lower surface sufficiently prohibits the moisture from infiltrating between the shingles. However, applying the hydrophobic material to both the upper and lower surfaces of the shingle further improves the hydrophobicity of the stacked shingles and further inhibits wicking of water between stacked shingles.

A variety of different hydrophobic materials may be used. For example, in certain embodiments, a non-polar silane such as methyl, propyl, or similar material is used. The silane material may be applied to the shingle as a dilute water solution and then dried. However, a variety of other hydrophobic materials may be used, such as, for example, wax emulsions, oils, silicones, siloxanes, SBR or esters of acrylic resins. As discussed above, these hydrophobic materials increase the hydrophobicity of the surface as measured by the contact angle of moisture droplets that contact the surface.

In certain embodiments, a silane solution having a silane concentration in the range of about 0.25% to 2% was applied to the back of a shingle sheet during production at a rate of about 0.3 to 6 g silane/sq (One sq is 300 sf of shingles). The silane solution increased the dynamic contact angle of the sheet at 10 minutes from the 40-60 degrees range to the 80-120 degree range. In one exemplary embodiment, a silane solution having a silane concentration of about 0.5% was applied to the back of a shingle sheet during production at a rate of about 1.1 g silane/sq. The silane solution increased the dynamic contact angle of the sheet at 10 minutes from the 40-60 degrees range to the 80-120 degree range. As such, after the silane solution was applied to the back of the sheet and the sheet was cut into shingles and bundled, the bundles of shingles did not wick water in between the layers of shingles.

In certain embodiments, the back of shingle sheets were sprayed with a silane solution having a silane concentration of about 0.5% during production at the rate of about 0.7 g silane/sq. The sheets were cut and laminated into shingles and wrapped into bundles with 2.2 mil polyethylene wrappers. Bundles of shingles (both treated and untreated) were then placed on pallets in a shower that delivered 44 inches of water over a 48 hour period. The wrappers were opened and the shingles were observed for water. The bundles having been treated shingles were almost completely dry (i.e., less than 25% of the bottom surface area of the second shingle from the top of the stack was wet) while the bundles of untreated shingles contained substantial amounts of water between shingles (i.e., greater than 25% of the bottom surface area of the second shingle from the top of the stack was wet).

Figure 7A:
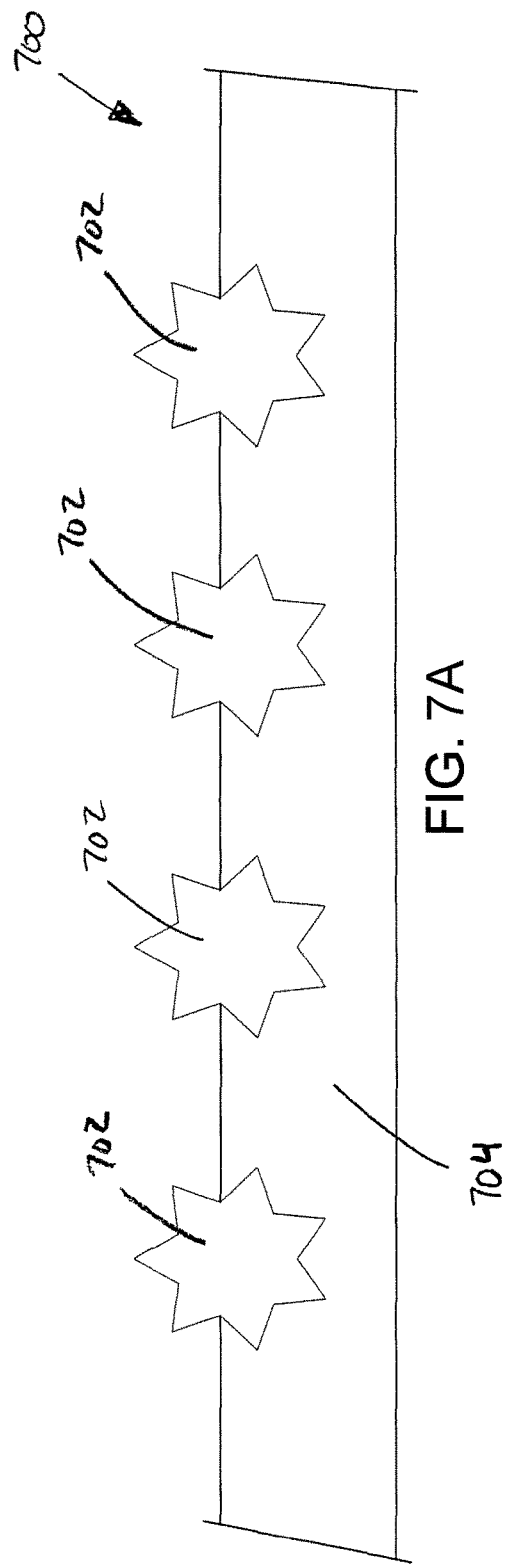
FIG. 7A illustrates an exemplary embodiment of particles embedded in an asphalt coating of a shingle.
Figure 7B:
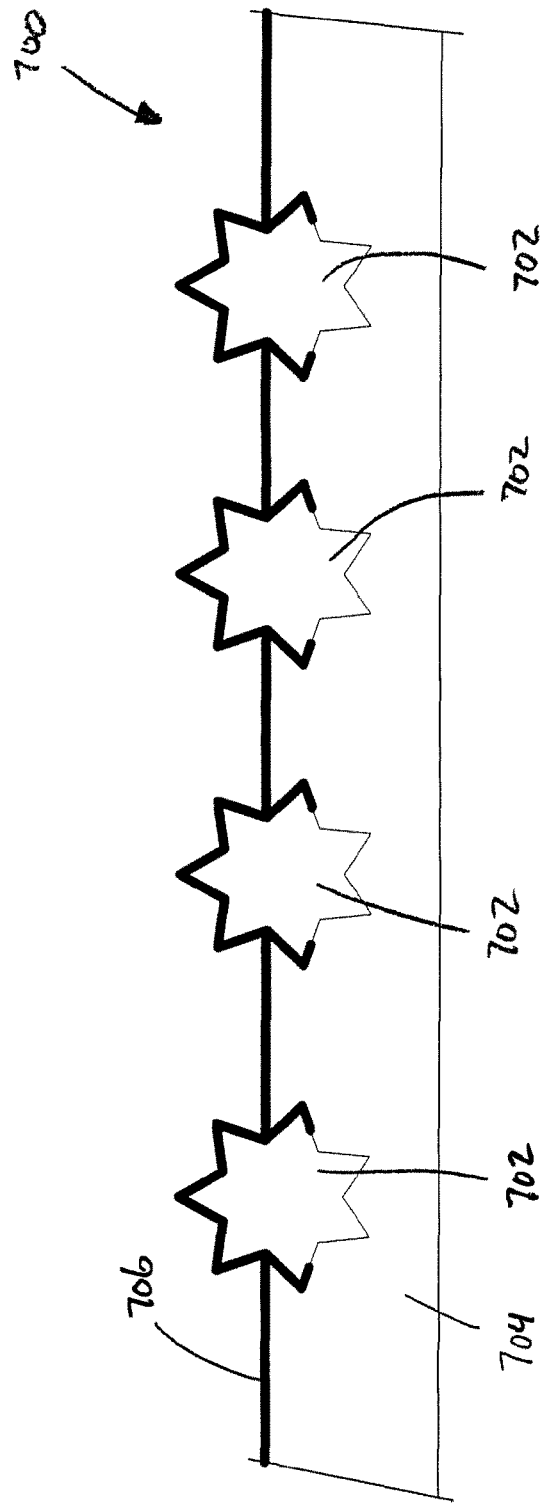
FIG. 7B illustrates an exemplary embodiment of a hydrophobic material applied to the particles and asphalt coating of the shingle illustrated by FIG. 7A.

The silane bonds to the lower surface of the shingle, including the surfaces of the backdust particles, and will generally only be a few monolayers thick at the concentrations used (e.g., between about 0.25% to 2% silane). As such, the silane produces a hydrophobic surface but does not prevent laminating adhesives and sealants from bonding to the back of the shingle. For example, FIG. 7A illustrates backdust particles 702 embedded in the asphalt coating 704 of a shingle 700. FIG. 7B illustrates silane 706 applied to the lower surface of the shingle 700 while the asphalt coating is still hot. As shown, the silane 706 coats the backdust particles, the lower surface between the backdust particles 702, and also seeps in between the backdust particles and the asphalt coating.

As shown in FIG. 1B, shingles are often formed from shingle sheets laminated together with an adhesive. Further, a shingle sealant is generally applied to the surface of a shingle and is used to bond adjacent shingles together when installed on a roof. Sealants may be applied to the surface of a shingle before and/or after the hydrophobic coating is applied to the surface of the shingle. The Applicants have discovered that adding the silane solution to the surface of the shingle does not affect the bond strength between two shingles via the sealant, but actually may enhance the bonding of the shingles together with the sealant. For example, the Applicants tested sheets having 0.25% and 0.5% silane solutions sprayed on the back of the shingle sheet while the asphalt was still hot at a rate of 0.16 lb. of solution/100 sq. ft. No reduction in bond strength between the shingles per ASTM D3462 due to the addition of the silane was observed in any of the tests. In some of the tests, the bond strength between the shingles increased with the silane solution. Thus, adding the silane solution to one or more surfaces of a shingle does not affect the bond strength between two shingles via the sealant but instead can enhance the bonding between the shingles.

Silicones and wax emulsions are also effective in producing a hydrophobic surface and may block water absorption. However, these types of materials will often act as a release agent and form a barrier film on the surface of the shingle, thus affecting the ability of laminating adhesives and sealants to bond to the back of the shingle.

The hydrophobic material of the present application may also comprise certain particles or materials included in the backdust or granules of the shingle that increase the hydrophobicity of the shingle. The Applicants have discovered that the addition of certain particles or materials in the backdust or granules of the shingles, even in small amounts, affects the hydrophobic/hydrophilic nature of the shingle.

Figure 8:
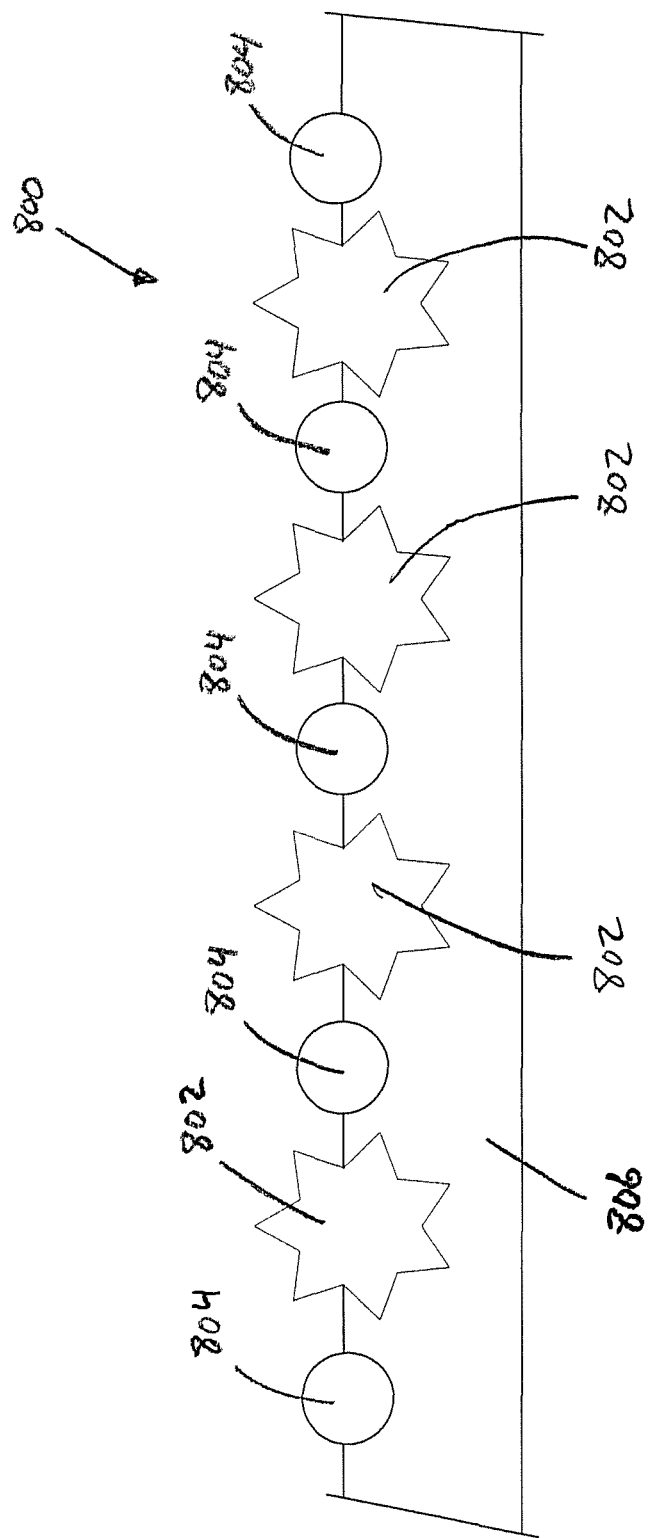
FIG. 8 illustrates an exemplary embodiment of a shingle having hydrophobic particles embedded in the asphalt coating along with other particles embedded in the asphalt coating.

For example, FIG. 8 illustrates a shingle 800 having hydrophobic particles 804 embedded in the asphalt coating 806 on the lower surface of the shingle along with backdust particles 802. In certain embodiments, the hydrophobic particles 804 are embedded in the asphalt coating on the upper surface of the shingle along with the granules. Similar to the hydrophobic coatings described above, the hydrophobic particles 804 increase the contact angle of the moisture contacting the back surface of the shingle, thus prohibiting moisture from infiltrating between the stacked shingles. The hydrophobic particles may be a variety of particles, including but not limited to Titanium dioxide ($TiO_2$), talc, and alumina.

The Applicants have discovered that certain Titanium minerals make the shingles more hydrophobic as measured both by contact angles and water pickup through the back of the shingle and also as measured with the bundle rain test. For example, in certain embodiments, small amounts of $TiO_2$ are added to the silica sand backdust on the lower surface of shingle sheets. In one embodiment, 0.25% $TiO_2$ was added to the silica sand before the backdust was applied to the back of the shingle. The addition of this $TiO_2$ increased the contact angle of the lower surface greater than 20 degrees, or about 22 degrees. Further, the 0.25% $TiO_2$ shingle was soaked by placing it on a wet sponge for about two weeks to measure the water absorption of the shingle. The weight of the shingle increased less than 1.5% during this time, whereas the weight of a shingle without the 0.25% $TiO_2$ increased almost 2.0%, over a 30% increase. As such, the $TiO_2$ reduced the shingle's ability to absorb moisture.

The 0.25% $TiO_2$ shingle was also tested to determine whether the $TiO_2$ could withstand rain and whether the $TiO_2$ affected the adhesion of the backdust or granules. The Applicants found that no noticeable amount of the $TiO_2$ washed off the lower surface of the shingle and that there was no observable difference in shingle bond strength when compared to the shingle without the $TiO_2$.

As discussed herein, the addition of a hydrophobic material (e.g., the hydrophobic coatings and hydrophobic particles discussed herein) prohibits moisture from infiltrating between the stacked shingles. As such, the hydrophobic material reduces granule loss during handling and installation of the shingles and reduces the ability of the shingles to freeze together in cold weather. Furthermore, the hydrophobic material may increase shingle life by keeping the underside of the shingle dry on the roof and preventing water infiltration under the shingle. The hydrophobic material may also help reduce leaks by preventing water from wicking under shingles. Also, the hydrophobic material may reduce the wet time of shingles on the roof, which has been shown to directly correlate to reduced algae growth, thus reducing the need for algae resistant granules.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "connector", "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A shingle comprising:
    a substrate having a first asphalt coating on a top surface of the substrate and a bottom surface of the substrate;
    a surface layer of granules embedded in the first asphalt coating on the top surface of the substrate;
    a backdust layer of particles embedded in the first asphalt coating on the bottom surface of the substrate;
    a sealant layer comprising a top surface and a bottom surface, wherein the top surface of the sealant layer abuts the backdust layer; and
    a hydrophobic coating disposed on the bottom surface of the sealant layer, wherein the hydrophobic coating comprises a silicone,
    wherein the hydrophobic coating is disposed on the backdust layer and the sealant layer around a perimeter of the shingle,
    wherein the hydrophobic coating extends a distance between about 0.5 inches and about 3 inches from each edge of a lower surface of the shingle.

2. The shingle according to claim 1, wherein the hydrophobic coating is disposed on both the backdust layer and the sealant layer.

3. The shingle according to claim 1, wherein the hydrophobic coating covers the entire bottom surface of the sealant layer.

4. The shingle according to claim 1, wherein the hydrophobic coating covers the entire bottom surface of the substrate.

5. The shingle according to claim 1, wherein the hydrophobic coating is disposed on a top surface of the shingle.

6. The shingle according to claim 1, wherein a contact angle of the sealant layer with the hydrophobic coating is greater than 70 degrees.

7. A method of manufacturing a shingle, the method comprising:
    coating a substrate with asphalt to form an asphalt coated substrate;
    applying a plurality of granules to a top surface of the asphalt coated substrate;
    applying a backdust material to a bottom surface of the asphalt coated substrate;
    applying a sealant layer to the backdust material, wherein the sealant layer comprises a top surface and a bottom surface, wherein the top surface of the sealant layer abuts the backdust material; and
    applying a hydrophobic coating to the bottom surface of the sealant layer, wherein the hydrophobic coating comprises a silicone.

8. The method according to claim 7, further comprising applying the hydrophobic coating to at least a portion of the backdust material.

9. The method according to claim 7, further comprising applying the hydrophobic coating to an entire bottom surface of the shingle.

10. The method according to claim 7, wherein the hydrophobic coating is applied to the entire bottom surface of the sealant layer.

11. The method according to claim 7, further comprising applying the hydrophobic coating to at least a portion of the backdust material, wherein the hydrophobic coating is applied to the backdust material and sealant layer around a perimeter of the shingle.

12. The method according to claim 11, wherein the hydrophobic coating extends a distance between about 0.5 inches and about 3 inches from each edge of a lower surface of the shingle.

13. The method according to claim 7, further comprising applying the hydrophobic coating to a top surface of the shingle.

14. The method according to claim 7, wherein a contact angle of the sealant layer with the hydrophobic coating is greater than 70 degrees.

15. The method according to claim 7, wherein the hydrophobic coating is applied to the bottom surface of the sealant layer by spraying the hydrophobic coating on the bottom surface of the sealant layer.

16. The method according to claim 7, wherein the hydrophobic coating is applied to the bottom surface of the sealant layer by rolling the hydrophobic coating on the bottom surface of the sealant layer.

* * * * *